R. J. ANDERSON.
PROCESS FOR THE REDUCTION OF IRON AND LEAD ORES.
APPLICATION FILED NOV. 5, 1919.
1,381,689.
Patented June 14, 1921.
2 SHEETS—SHEET 1.
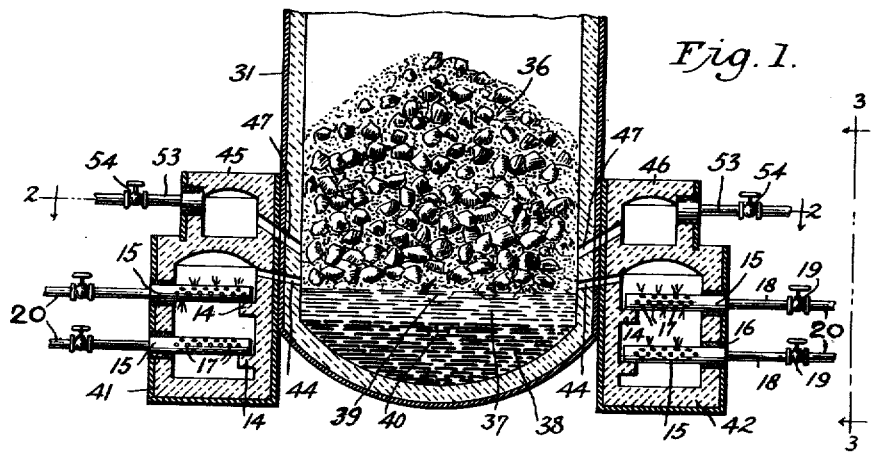
Fig. 1.
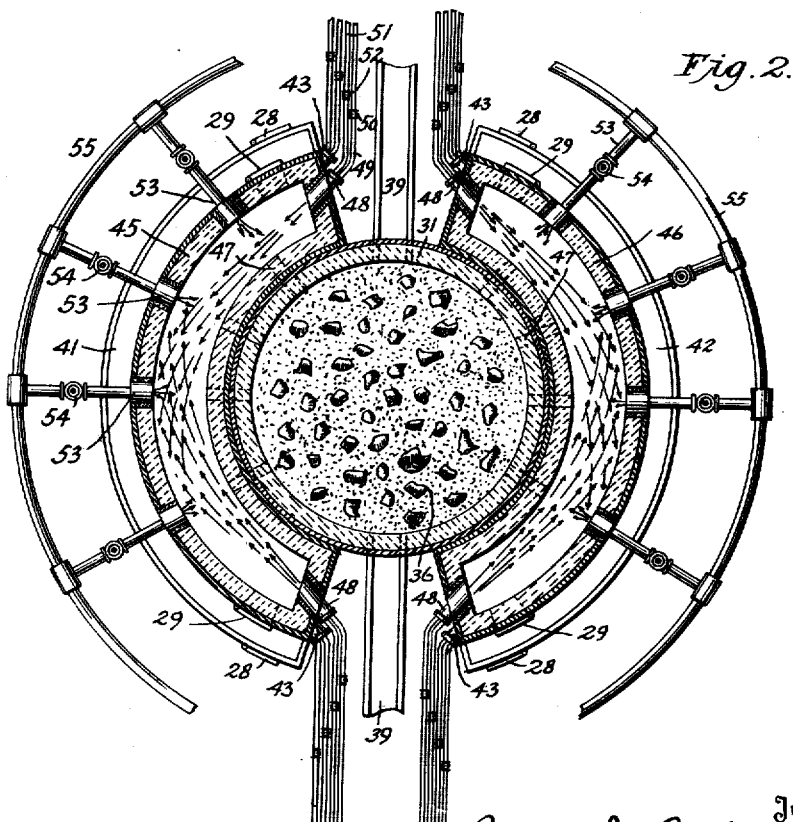
Fig. 2.
Inventor
Robert J. Anderson
By
Attorney R. J. ANDERSON.
PROCESS FOR THE REDUCTION OF IRON AND LEAD ORES.
APPLICATION FILED NOV. 5, 1919.
1,381,689.
Patented June 14, 1921.
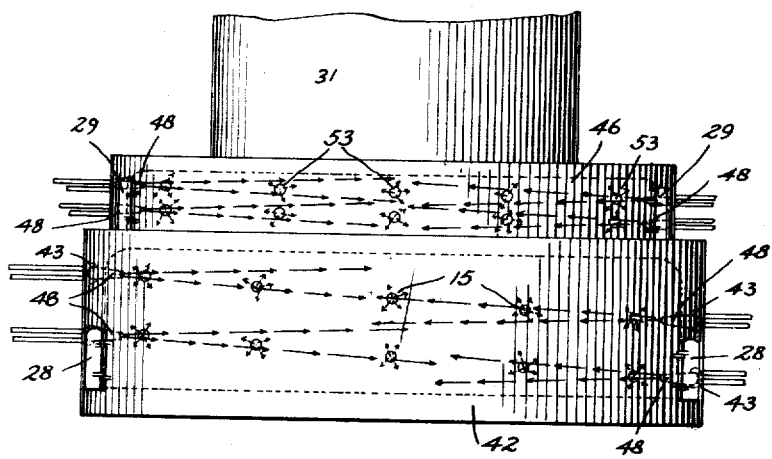
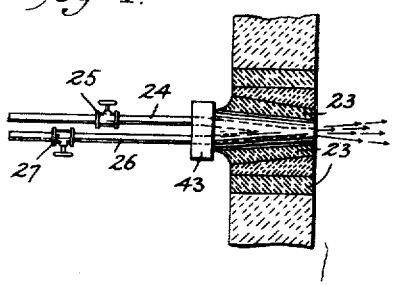
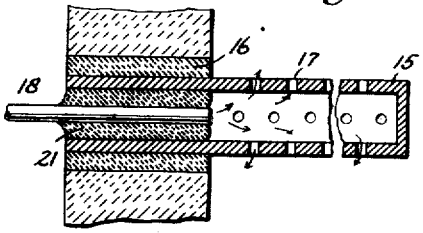
Inventor
Robert J. Anderson
By
his Attorney

UNITED STATES PATENT OFFICE.

ROBERT J. ANDERSON, OF EL PASO, TEXAS, ASSIGNOR TO INTERNATIONAL FUEL CONSERVATION CO., OF PHOENIX, ARIZONA, A CORPORATION OF ARIZONA.

PROCESS FOR THE REDUCTION OF IRON AND LEAD ORES.

1,381,689. Specification of Letters Patent. Patented June 14, 1921.

Original application filed March 6, 1919, Serial No. 281,037. Divided and this application filed November 5, 1919. Serial No. 335,937.

*To all whom it may concern:*

Be it known that I, ROBERT J. ANDERSON, a citizen of the United States, residing at El Paso, in the county of El Paso and State of Texas, have invented certain new and useful Improvements in Processes for the Reduction of Iron and Lead Ores, of which the following is a specification.

This invention relates to processes for the reduction of iron and lead ores.

The present application is a division of my application for combustion processes, filed March 6, 1919, Serial No. 281,037.

The apparatus, means, and elements described herein and disclosed in the accompanying drawings are set forth and claimed in my application for combustion apparatus, filed March 6, 1919, Serial No. 281,038.

My process contemplates two separate combustion processes, one of which effects substantially complete conversion of all of the fuel and oxygen into $CO_2$ heat units directly conveyed to the ore body, while the other, supplemental or secondary, combustion process involves the combining of air and fuel in such proportion that there is an excess of carbon, the gas evolved being carbon monoxid (CO) which is directly introduced into the ore body for the purpose of satisfying, by the excess of carbon thus derived from the secondary combustion process, the oxygen liberated from the ore thereby accomplishing the reduction and deoxidization thereof.

By delivering the $CO_2$ gases derived from my main combustion process and the CO gases derived from my secondary combustion process directly into a body of iron ore in a blast furnace, iron or steel of different grades may be directly produced, according to air and fuel regulation under the process. Similarly, metallic lead may be directly smelted out of lead ore.

My process is practised in separate closed chambers, and combustion, to produce the desired tenor of the gases, is completed therein, the heat units from combustion being led from the combustion chamber to the point of utilization. A smoke stack or chimney is eliminated when my process is practised, in so far as the utilization of the same has been heretofore had for the purpose of the creation of draft and furnishing air for combustion. The sole function of the chimney or smoke stack, when used in connection with the practice of my combustion process, is for the reception of waste gases and products of combustion after useful work has been performed, and conveying the same to a suitable elevation and then dissipating them into the air.

No particular size or proportions of the combustion chambers used in practising my process is necessary, the size and proportions being determined by the size and the nature of the installation in connection with which my process of combustion is used.

In carrying out my process, there are separately jetted, sprayed, or otherwise forced or introduced into separate closed combustion chambers, at an angle, preferably nearly a right angle, to the direction of final travel of the gases derived from combustion as they flow toward their point of utilization, numerous streams of air and fuel which play across or intersect at a very great number of points. The fuel may comprise finely divided coal, coke, or other solid carbonaceous material, or may be any hydrocarbon or gaseous fuels. Whatever fuel is used in the primary combustion process, it will be introduced into the primary combustion chamber in connection with air or steam jets under pressure in a manner whereby not only the exterior of the body or mass of flame derived from combustion will be converted into $CO_2$, but the entire interior of the mass or body of flame will be similarly converted instead of escaping, as has heretofore been the case, in the form of incompletely combusted carbon and, instead of a large percentage of the fuel passing off as waste without liberation of heat units, substantially the entire body of fuel introduced within the primary combustion chamber will combine with the oxygen of the air jets, all of which results in liberation of a maximum number of heat units with a minimum of uncombined carbon and oxygen.

In carrying out the secondary combustion process, the same method of introducing the fuel and the air or steam jets is carried on in the secondary combustion chamber as in the primary combustion chamber but this secondary process is so practised that there is an excess of carbon, the gas evolved being CO.

The introduction of the jets or sprays of air and fuel into the combustion chambers is not restricted to any particular means. However, to insure as nearly perfect combustion as may be possible, I prefer to jet or spray the fuel in under suitable pressure and to disseminate the air throughout the cross-playing streams of fuel by forcing it in through perforated tubes of refractory material, or like distributing devices, located within the combustion chamber, the jets or streams of fuel playing crosswise relative to the tubes and, in turn, being shot through and through by the oxygen derived from the numerous fine jets of air issuing from said tubes.

The cross-jetting of the fuel and air at an angle, preferably nearly a right angle, to the direction of final travel of the gases derived from combustion as they flow toward their point of utilization, accomplishes an important function in effecting the desired combustion before they pass from the primary and secondary chambers to charge of ore.

In the accompanying drawings,

Figure 1 is a vertical section of a blast furnace for the smelting of iron ore by the practice of my primary and secondary combustion processes;

Fig. 2 is a horizontal section on the line 2—2 of Fig. 1;

Fig. 3 is a detail elevation on the line 3—3 of Fig. 1 illustrating the interaction of the fuel and air jets in carrying out the primary and secondary processes;

Fig. 4 is a detail section showing one of the nozzles for injecting the fuel, and the manner in which it is sealed in the wall of the combustion chamber;

Fig. 5 is a detail section illustrating the manner of securing one of the refractory air distributing tubes.

The following apparatus which is adapted for carrying on my process, is set forth and claimed in my application Serial No. 281,038, filed March 6, 1919. A water jacketed shell 1 contains the ore charge 36. The slag is shown at 37 and metallic iron, or lead, at 38. The usual slag spout 39 and metal spout 40 are provided. The primary combustion chambers are shown at 41 and 42. These may be all arc shaped and surround the furnace shell 1 as far as possible. The air distributers appear at 15. The fuel for the primary combustion chambers 41, 42 is jetted or sprayed by nozzles 43 located at the ends of the chambers 41 and 42 and in sufficient number and arrangement to carry out, in connection with the air distributers 15, the primary combustion process, hereinafter explained. The $CO_2$ gases pass from the combustion chambers 41, 42 through twyers 44 into the ore charge 36.

In smelting iron and lead ores, it is necessary to provide, in addition to the $CO_2$ gases required for melting, an additional step or process which will provide for an excess of carbon to be introduced into the ore to satisfy the oxygen liberated therefrom.

My process, as applied to the smelting of ores such as iron ore and lead ore which yield oxygen, when smelted, therefore contemplates a metallurgical action and this involves the carrying on of a secondary combustion process which may be effected in supplemental or secondary combustion chambers 45, 46 which may be superposed on the combustion chambers 41, 42. These chambers may be of arc shape as shown in Fig. 2 and very nearly surround the furnace shell. Twyers 47, leading from the chambers 45 and 46 at suitable points, deliver the CO gases derived from combustion carried on in said chambers, into the body of the ore 36 to combine with the oxygen therein. In carrying out this secondary process, the carbon bearing fuel is jetted or sprayed into the chambers 45 and 46 by suitable means, such as nozzles 48 to which the fuel is delivered by a pipe 49 having a suitable valve 50. The fuel is injected into the combustion chambers 45 and 46 by air or steam supplied by pipes 51 having suitable valves 52. The air is introduced into chambers 45, 46 from nozzles 53 under suitable valve control 54 and supplied by any suitable air feed pipe 55. Air distributers, such as shown at 15, are dispensed with and the air jetted in directly from the nozzles 53, as shown in Fig. 2. In carrying out the secondary process in the chambers 45 and 46 the regulation of air and fuel is such that an excess of carbon is developed from the combustion and as a result the gases derived from the secondary combustion process are in the form of carbon monoxid (CO) and pass through the twyers 47, the excess carbon combining with the oxygen liberated from the ore 36 under the smelting action effected by the $CO_2$ gases which pass through the twyers 44.

With the exception that CO gas is evolved in the combustion chambers 45, 46, the secondary combustion process is the same as the primary combustion process, as the cross play of the fuel and air jets in relation to each other and the cross play of both fuel and air jets in relation to the direction of final travel of the gases derived from combustion, such gases passing out through the twyers 47. The cross play of the fuel and air jets in the chambers 41, 42 is shown in Figs. 2 and 3. The staggered or step relation of the air jet nozzles 53 in relation to the fuel nozzles 48 is shown in Fig. 3 and in that figure the staggered relationship of the air distributers and fuel nozzles for the primary combustion chambers, is also shown.

My primary process comprises the carrying on of combustion, in a novel manner, in the chambers 41 and 42 which are sealed from the outer air and have no outlet except the twyers 44. The oxygen supplied to the interiors of the chambers 41 and 42 is that which is derived solely from air jetted or sprayed inside the chambers 41 and 42.

Extending across the combustion chambers, and suitably supported as at 14, are a number of nozzles or air distributing tubes 15 of some suitable refractory material. These tubes or distributers extend through the wall of the combustion chamber and are sealed therein by fire clay 16, Fig. 5. The tubes or pipes 15 are provided with numerous openings or perforations 17 which are relatively small so that the air will issue therefrom substantially at right angles to the lengths of the tubes 15 in the form of numerous fine jets or sprays as indicated, for instance, in Fig. 3. As many of the air distributers 15 as may be desired or as may be found necessary, can be used. I have shown two rows thereof, at different levels, but in other forms of apparatus for practising the process, a greater or lesser number of these air distributers may be used. The air distributers receive air in suitable volume and under suitable pressure, from pipes 18, each pipe having a valve 19 to control the admission of the air; the pipes 18 may receive their air from any suitable source, such, for instance, as feed pipes 20. The pipes 18 are sealed where they enter the distributers 15 by fire clay wads 21, Fig. 5. The air distributers 15 of the respective rows, are arranged in stepped or staggered formation for a purpose which will presently appear.

The fuel is jetted or sprayed into the primary combustion chambers 41 and 42 in finely divided form. Such fuel may comprise finely divided coal, coke, or other solid carbonaceous material, or may be any hydrocarbon or gaseous fuel. I have illustrated how a hydrocarbon oil may be jetted or sprayed into the combustion chambers 41 and 42 by the use of ordinary air or steam pressure nozzles, in the various disclosures of apparatus used in practising my primary combustion process, but it is to be understood that any suitable, or preferred, means for jetting or spraying any fuel which may be used, can be employed for this purpose. In Fig. 4 there is shown an ordinary jetting or spraying nozzle or distributer 43 which may be suitably sealed in the wall of the combustion chamber by fire clay 23. The fuel, for instance hydrocarbon oil, is introduced to the nozzles through pipes 24 having valves 25 connected to any suitable source of supply. The air or steam for spraying the oil is introduced to the nozzles by pipes 26 having valves 27.

The fuel distributing nozzles 43 are so located that they will cause the fuel to be jetted, or sprayed in finely divided form crosswise or at an angle to the lengths of the air distributers 15, and crosswise in relation to the air jets issuing from the perforations 17. The cross play of the finely divided fuel jets and the direction of play of the air jets issuing from the perforations 17 is at an angle, preferably nearly at a right angle, to the direction of final travel of the gases derived from combustion as they flow toward their point of utilization. In other words, the cross play or interaction of the jets or sprays of fuel and the jets of air from the distributers 15, instead of being in a direction toward the outlets from the combustion chamber as has heretofore been proposed, and which has resulted in incomplete combustion and great waste, in my process, on the other hand, the fuel jets and air interact to effect substantially complete combustion and substantially complete liberation of the heat units before the flow of gases to be subsequently utilized proceeds toward the outlet or outlets from the combustion chamber. Consequently, my process obtains a new result, due to the cross play and interaction of the fuel and oxygen derived from the air jets to the end that not only the exterior of the body or mass of flame derived from combustion is converted into $CO_2$ but, also, the entire interior of the mass or body of flame is thus converted, in the primary combustion process carried on in the chambers 41 and 42. The staggered relationship of the rows of air distributers 15 to the nozzles 43 insures that the air issuing from the perforations 17 of each air distributer 15 will form a complete admixture with the jetted or sprayed fuel from the nozzles.

In carrying out my secondary process, the relative disposition of the fuel nozzles 48 and air nozzles 53 for the secondary combustion chambers 45, 46, is substantially the same as exists between the nozzles 43 and air distributers 15 and there is an intermingling of the fuel and air but the regulation of air and fuel is such that an excess of carbon is developed from the combustion and carbon monoxid (CO) is produced in chambers 45, 46 and supplied through the twyers 47 to the ore charge 36.

Doors 28 and 29 are provided for suitable openings in the combustion chambers 42—43, and 45—46 through which the fuel may be initially ignited by suitable means.

What I claim is:—

1. A process for the reduction of ores consisting in the maintenance of independent primary and secondary combustion processes, the primary combustion process comprising the development of substantially complete combustion and the delivery of the gases derived therefrom to the ore, the secondary combustion process comprising the development of partially complete combustion, with production of an excess of carbon and the delivery of the products of such secondary combustion to the ore independently of the delivery of the gases derived from the primary combustion process for the utilization of the excess carbon in the reduction of the ore.

2. A process for the smelting of iron, lead, and other ores, consisting in the maintenance of independent primary and secondary combustion processes in separate chambers, the primary combustion process being carried on to convert the fuel and air into $CO_2$ gases, and the secondary combustion process being carried on so as to produce $CO$ gases, and the independent delivery of both the $CO_2$ and $CO$ gases to the ore charge.

In testimony whereof I affix my signature.

ROBERT J. ANDERSON.